(12) United States Patent
Gardiner

(10) Patent No.: US 9,964,765 B2
(45) Date of Patent: May 8, 2018

(54) VIRTUAL DISPLAY OF THE REAL-TIME POSITION OF A ROBOTIC DEVICE TO A HUMAN OPERATOR POSITIONED ON AN OPPOSING SIDE OF AN OBJECT

(71) Applicant: The Boeing Company, Chicago, IL (US)

(72) Inventor: Jim Gardiner, Everett, WA (US)

(73) Assignee: The Boeing Company, Chicago, IL (US)

( * ) Notice: Subject to any disclaimer, the term of this patent is extended or adjusted under 35 U.S.C. 154(b) by 70 days.

(21) Appl. No.: 14/852,196

(22) Filed: Sep. 11, 2015

(65) Prior Publication Data
US 2017/0075116 A1 Mar. 16, 2017

(51) Int. Cl.
*G09G 5/14* (2006.01)
*G02B 27/01* (2006.01)
*G06T 7/00* (2017.01)

(52) U.S. Cl.
CPC ............ *G02B 27/017* (2013.01); *G06T 7/004* (2013.01); *G02B 2027/0138* (2013.01); *G02B 2027/0141* (2013.01); *G02B 2027/0187* (2013.01); *G06T 2207/30204* (2013.01); *Y10S 901/47* (2013.01)

(58) Field of Classification Search
CPC .................................................... G02B 27/017
USPC ......................................................... 345/633
See application file for complete search history.

(56) References Cited

U.S. PATENT DOCUMENTS

| | | | |
|---|---|---|---|
| 6,708,142 B1* | 3/2004 | Baillot ..................... | G06T 17/00 345/473 |
| 6,771,294 B1* | 8/2004 | Pulli ........................ | G06F 3/011 345/173 |
| 7,719,563 B2* | 5/2010 | Richards ............. | G06F 3/04815 348/36 |
| 8,847,953 B1* | 9/2014 | Cho .................... | B29C 67/0085 345/419 |
| 2002/0094189 A1* | 7/2002 | Navab .................... | H04N 19/27 348/207.99 |
| 2005/0256391 A1* | 11/2005 | Satoh ........................ | G06T 7/74 600/407 |
| 2006/0170652 A1* | 8/2006 | Bannai .................... | G06F 3/011 345/156 |

(Continued)

OTHER PUBLICATIONS

First Person Indoor/Outdoor Augmented Reality Application: ARQuake Bruce Thomas, Ben Close, John Donoghue, John Squires, Phillip De Bondi and Wayne Piekarski, (2002) 6:75-86.*

*Primary Examiner* — Javid A Amini
(74) *Attorney, Agent, or Firm* — Duft Bornsen & Fettig LLP

(57) ABSTRACT

Systems and methods for virtually displaying a robotic device to a human operator. An exemplary system includes an augmented reality headset for use by the human operator. The system includes a first imaging device having a field of view of a first side of an object, and tracks coordinate data for a first marker on the robotic device positioned on the first side. The system includes a second imaging device having a field of view of a second side of the object, and tracks coordinate data for a second marker on the augmented reality headset positioned on the second side. The system includes a controller that generates a virtual image of the robotic device in a coordinate system based on the coordinate data for the first and second markers, and provides the virtual image of the robotic device to the augmented reality headset for display to the human operator.

16 Claims, 5 Drawing Sheets

(56) References Cited

U.S. PATENT DOCUMENTS

| | | | |
|---|---|---|---|
| 2007/0098234 A1* | 5/2007 | Fiala | G06K 9/3216 382/120 |
| 2010/0033404 A1* | 2/2010 | Hamadou | G06T 7/20 345/8 |
| 2011/0216002 A1* | 9/2011 | Weising | G09G 5/08 345/158 |
| 2012/0075484 A1* | 3/2012 | Kawamoto | G06T 19/006 348/207.1 |
| 2012/0113228 A1* | 5/2012 | Konno | H04N 13/0239 348/47 |
| 2012/0249590 A1* | 10/2012 | Maciocci | G06F 3/011 345/633 |
| 2012/0256961 A1* | 10/2012 | Ogasawara | A63F 13/06 345/659 |
| 2012/0293549 A1* | 11/2012 | Osako | H04N 13/0275 345/633 |
| 2013/0083061 A1* | 4/2013 | Mishra | H04N 5/265 345/633 |
| 2014/0375794 A1* | 12/2014 | Singh | B01J 19/121 348/95 |
| 2015/0123996 A1* | 5/2015 | Ohashi | G02B 27/017 345/633 |
| 2016/0140930 A1* | 5/2016 | Pusch | G06F 3/011 345/633 |
| 2016/0158940 A1* | 6/2016 | Brockway | B25J 9/1687 700/114 |
| 2016/0196694 A1* | 7/2016 | Lindeman | G02B 27/0172 345/633 |
| 2016/0260255 A1* | 9/2016 | Bean | G06T 19/006 |
| 2016/0307374 A1* | 10/2016 | Kurz | G06T 19/006 |
| 2016/0327383 A1* | 11/2016 | Becker | G01B 11/005 |
| 2016/0342840 A1* | 11/2016 | Mullins | G06K 9/00671 |
| 2016/0379414 A1* | 12/2016 | Brown | G06T 19/006 345/633 |

\* cited by examiner

VIRTUAL DISPLAY OF THE REAL-TIME POSITION OF A ROBOTIC DEVICE TO A HUMAN OPERATOR POSITIONED ON AN OPPOSING SIDE OF AN OBJECT

FIELD

This disclosure relates to the field of manufacturing, and more particularly, to coordinating processes between a robotic device and a human operator.

BACKGROUND

When manufacturing products, such as aircraft for example, some of the assembly or fabrication may involve a robotic device that performs automated processes. Some of the automated processes may also include a human operator that is positioned on the opposite side of an object as the robotic device. When the object is large, the human operator may not be able to see how or where the robotic device is operating. For example, if the robotic device is drilling a hole through the object, the human operator will not be able to see where the robotic device is drilling until the drill bit pierces through the object. This may slow down the manufacturing processes, and may also be dangerous to the human operator. Therefore, manufacturers continue to look for ways to improve cooperation between human operators and robotic devices.

SUMMARY

Embodiments described herein use augmented reality to virtually display the real-time position and/or orientation of a robotic device. The human operator wears an augmented reality (AR) headset, and the real-time position and/or orientation of the robotic device is displayed to the human operator along with the real world environment. Therefore, the human operator can visualize how and where the robotic device is operating on the other side of an object. This can improve the speed of manufacturing processes, as well as improving the safety of the human operator in an automated environment.

One embodiment comprises a system for virtually displaying a robotic device to a human operator. The system includes an AR headset for use by a human operator. The system further includes a first imaging device having a field of view of a first side of an object, and configured to track coordinate data for a first marker on a robotic device positioned on the first side of the object. The system further includes a second imaging device having a field of view of a second side of the object that opposes the first side, and configured to track coordinate data for a second marker on the AR headset positioned on the second side of the object. The system further includes a controller configured to generate a virtual image of the robotic device in a coordinate system based on the coordinate data for the first marker and the coordinate data for the second marker, and to provide the virtual image of the robotic device to the AR headset for display to the human operator.

In another embodiment, a first fiducial marker is attached to an end effector of the robotic device, and the first imaging device is configured to track the coordinate data for the first fiducial marker.

In another embodiment, a second fiducial marker is attached to the AR headset, and the second imaging device is configured to track the coordinate data for the second fiducial marker.

In another embodiment, the first fiducial marker and the second fiducial marker each include a plurality of references points having a Light Emitting Diode (LED).

In another embodiment, the controller includes a virtual data storage configured to store virtual data for different types of tooling attached to an end effector of the robotic device. The controller further includes a virtual image generator configured to identify tooling on the end effector, to retrieve the virtual data for the tooling from the virtual data storage, and to generate the virtual image of the robotic device based on the virtual data for the tooling.

In another embodiment, the virtual image generator is configured to read a Radio Frequency Identification (RFID) tag to identify the tooling on the end effector.

In another embodiment, the first imaging device includes at least one camera, and a processor that uses photogrammetry to track the coordinate data for the first marker.

In another embodiment, the controller is configured to provide the coordinate data for the second marker on the AR headset to the robotic device.

In another embodiment, the object comprises a component of an aircraft.

Another embodiment comprises a method of virtually displaying a robotic device to a human operator, where the robotic device is positioned on a first side of an object and the human operator is positioned on a second side of the object which blocks the view of the human operator. The method includes tracking coordinate data for a first marker on the robotic device. The method further includes tracking coordinate data for a second marker on an AR headset worn by the human operator. The method further includes generating a virtual image of the robotic device in a coordinate system based on the coordinate data for the first marker and the coordinate data for the second marker, and providing the virtual image of the robotic device to the AR headset for display to the human operator.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
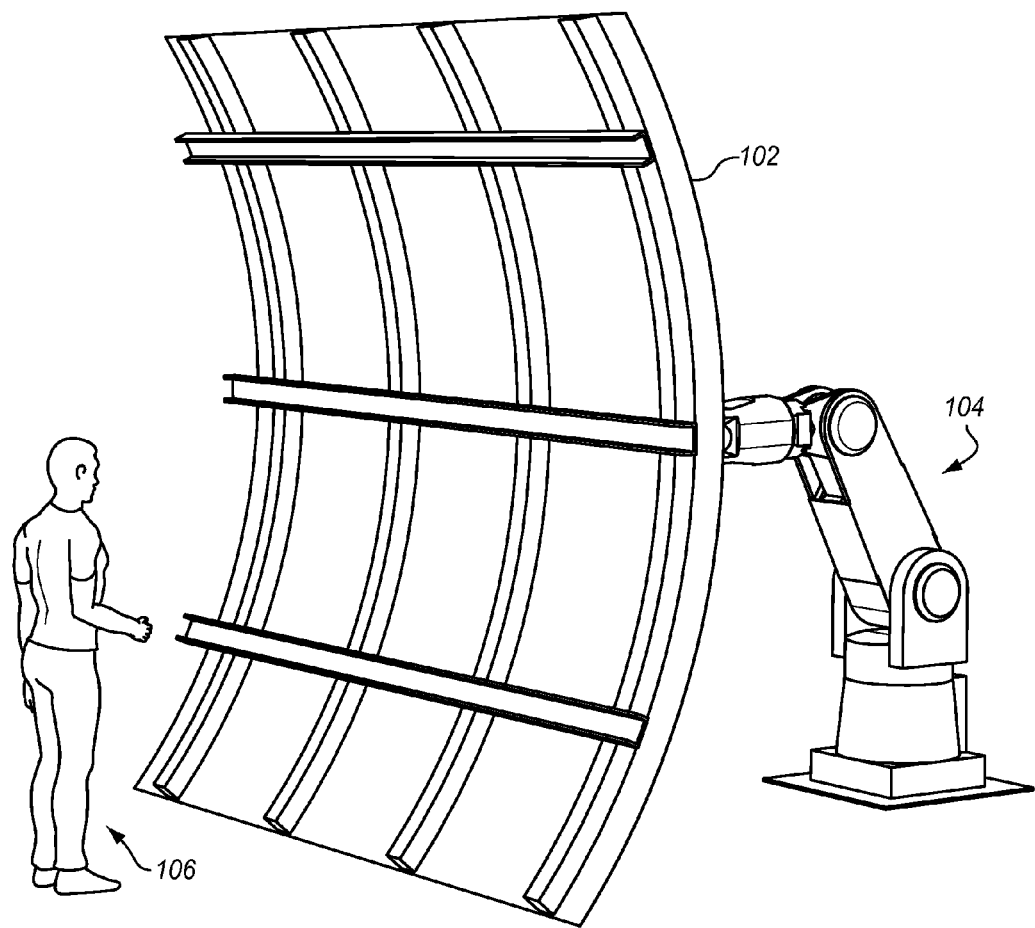
FIG. 1 illustrates a manufacturing process on an object in the prior art.

FIG. 1 illustrates a manufacturing process on an object 102 in the prior art. For this process, a robotic device 104 performs a function or action on one side of object 102. Robotic device 104 may comprise any type of programmable robot or industrial robot that is automatically controlled and programmable to perform functions in two or more axes. Examples of functions performed by a robotic device include drilling, welding, painting, assembly, pick and place, inspection, testing, etc. A human operator 106 may need to perform a function or action on the opposing side of object 102. Because object 102 is large and is made from a material that is not transparent, human operator 106 is not able to see how or where robotic device 104 is operating on the other side. For example, robotic device 104 may be drilling a hole through object 102, and human operator 106 will not be able to see where robotic device 104 is drilling until the drill bit pierces through object 102. This can be dangerous to human operator 106. In some instances, coordination between a human operator and a robotic device may not be allowed by health and safety agencies because of dangers such as this.

Figure 2:
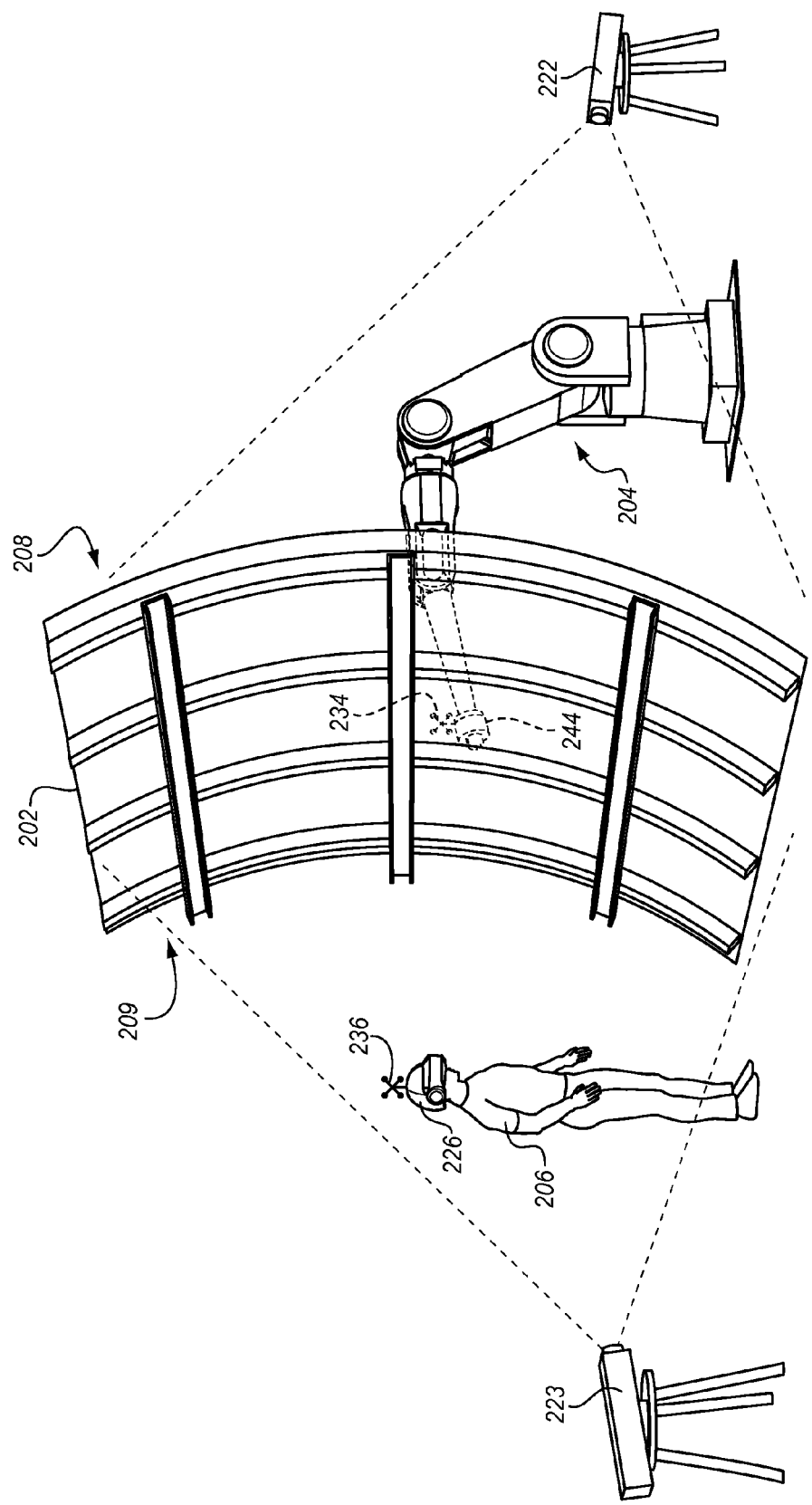
FIG. 2 illustrates a manufacturing process on an object in an exemplary embodiment.

FIG. 2 illustrates a manufacturing process on an object 202 in an exemplary embodiment. Object 202 may comprise a component of an aircraft, or any other type of object. For this process, a robotic device 204 performs a function or action on one side 208 of object 202, and a human operator 206 may need or want to perform a function or action on the opposing side 209 of object 202. To allow for improved coordination between robotic device 204 and human operator 206, a positioning system is used in this embodiment so that human operator 206 can "see" what is occurring on the other side of object 202.

The positioning system includes a pair of imaging devices 222-223. One of the imaging devices 222 is positioned on the same side 208 of object 202 as robotic device 204. Imaging device 222 has a field of view that is able to capture images of robotic device 204, and process the images to track the 3D position and/or orientation of robotic device 204. The other imaging device 223 is positioned on the same side 209 of object 202 as human operator 206, which is the opposing side of object 202 as robotic device 204. Imaging device 223 has a field of view that is able to capture images of human operator 206, and process the images to track the 3D position and/or orientation of human operator 206.

The positioning system further includes an augmented reality (AR) headset 226 that can be worn by human operator 206. An AR headset is a head-mounted display device that provides a simulated visual environment through lenses or glasses. The AR headset allows a user to see both a digital display and his/her surroundings through the lenses. The AR headset provides virtual images, videos, animation, or informational content to a user so that the virtual elements are added to the real world seen through the lenses.

To improve the accuracy of the positioning system, fiducial markers may be attached to robotic device 204 and AR headset 226. A fiducial marker is a marker that has one or more reference points that are enhanced in images. A fiducial marker may be passive, where the references points have retroreflectors that are able to reflect light. A fiducial marker may be active, where the reference points have Light Emitting Diodes (LEDs) or some other source for emitting light. In one embodiment, a fiducial marker 234 may be attached to an end effector 244 of robotic device 204 (also referred to as end-of-arm-tooling (EOT)). End effector 244 is the component of robotic device 204 that includes the tooling for performing an activity. Examples of end effectors include drills, welding devices, spray guns, grinding or debarring devices, gripper devices, etc. A fiducial marker 236 may also be attached to AR headset 226.

Figure 3:
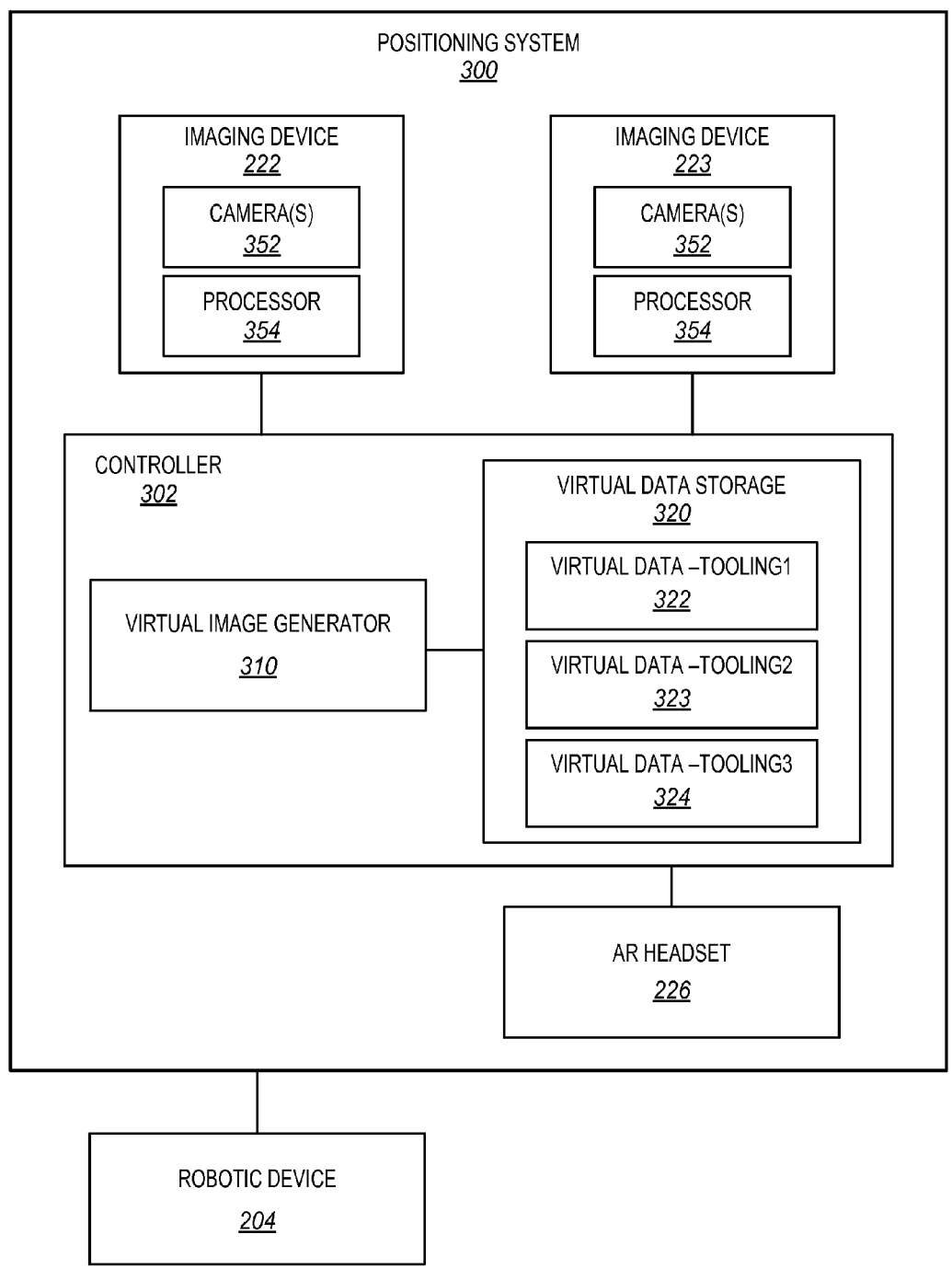
FIG. 3 is a schematic diagram of a positioning system in an exemplary embodiment.

FIG. 3 is a schematic diagram of a positioning system 300 in an exemplary embodiment. Positioning system 300 includes imaging devices 222-223 and AR headset 226. Imaging devices 222-223 are each configured to capture images, and track the position and/or orientation of markers in the images. The position and/or orientation of markers may be described by coordinate data, which is any data that describes the position of a marker in a coordinate system. For example, the coordinate data may describe the x, y, z position of a marker in a Cartesian coordinate system. The coordinate data may also describe the orientation of the marker, such as with a direction vector a, b, c. Imaging devices 222-223 may each include one or more cameras 352 that capture images, and a processor 354 that uses photogrammetry or another processing technique to track the position and/or orientation of markers in the images. One example of an imaging device is a Northern Digital Incorporated (NDI) measurement system.

Positioning system 300 also includes a controller 302 that is configured to process the coordinate data from imaging devices 222-223 to determine the relative positions of the markers on either side of object 202. For example, controller 302 is able to determine the position and orientation of robotic device 204 in a coordinate system based on the coordinate data from imaging device 222, and to determine the position and orientation of AR headset 226 in the coordinate system based on the coordinate data from imaging device 223. Controller 302 includes a virtual image generator 310 and virtual data storage 320. Virtual image generator 310 is configured to generate a virtual image of robotic device 204 based on the coordinate data received from imaging device 222. Virtual data storage 320 is configured to store virtual data 322-324 for robotic device 204. Virtual data 322-324 may comprise any graphics or other data that represents robotic device 204 or a portion of robotic device 204. For example, the virtual data 322-324 may comprise graphical representations of the different types of tooling on end effector 244.

Controller 302 provides a virtual image of robotic device 204 to AR headset 226, which displays the virtual image to human operator 206. Human operator 206 can therefore observe the virtual movements or actions of robotic device 204 even though it is positioned on the other side of object 202. Controller 302 may also provide data to robotic device 204 regarding the position and orientation of AR headset 226.

Controller 302 may comprise hardware, software, or a combination of hardware and software. For example, controller 302 may include a processor, which includes any electronic circuits and/or optical circuits that are able to perform functions. For example, a processor may include one or more Central Processing Units (CPU), microprocessors, Digital Signal Processors (DSPs), Application-Specific Integrated Circuits (ASICs), Programmable Logic Devices (PLD), control circuitry, etc. Some examples of processors include Intel® Core™ processors, Advanced Reduced Instruction Set Computing (RISC) Machines (ARM®) processors, etc. Controller 302 may also include a memory, which may include any electronic circuits, optical circuits, and/or magnetic circuits that are able to store data. Controller 302 may also include a suitable interface for communicating with imaging devices 222-223, robotic device 204, and/or AR headset 226. The communication medium for controller 302 to these devices may be a wired connection or a wireless connection.

Figure 4:
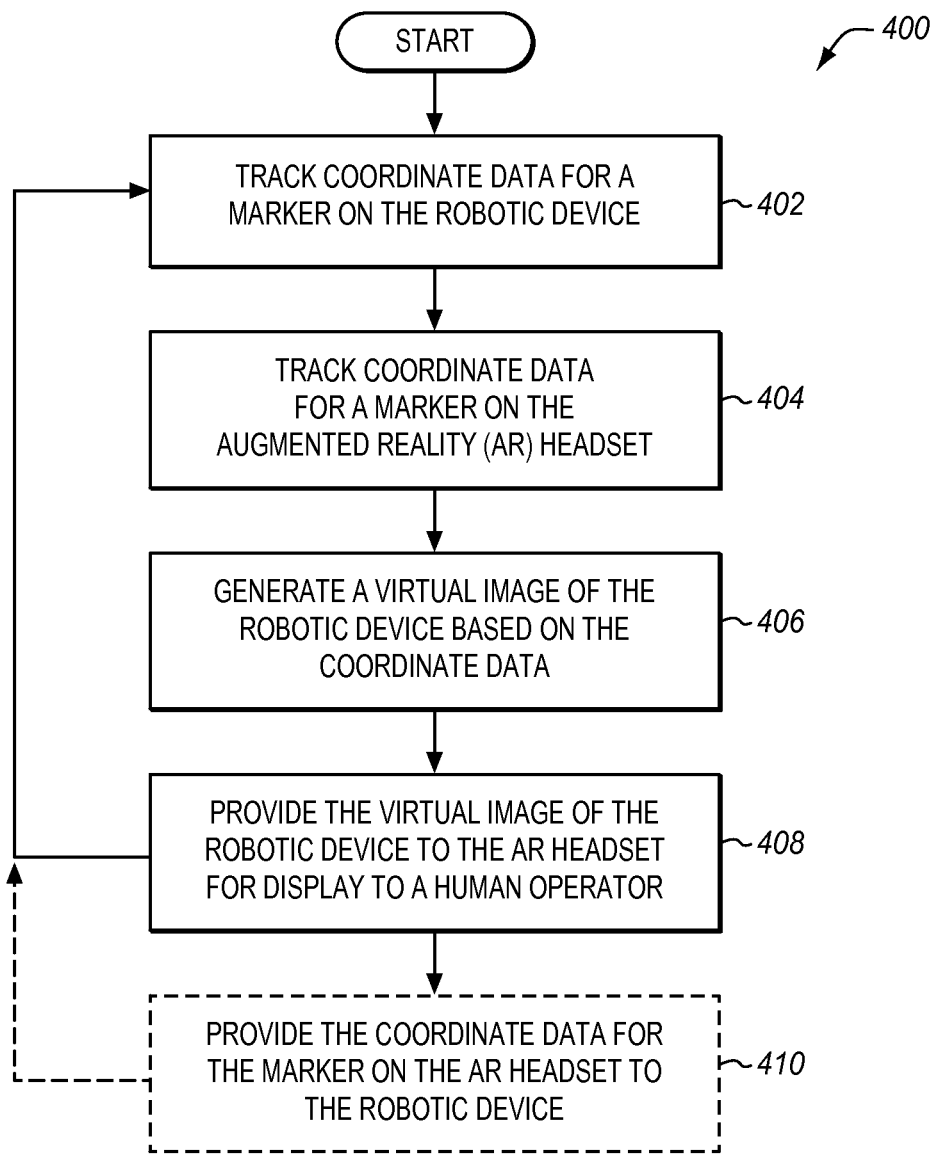
FIG. 4 is a flow chart illustrating a method of virtually displaying a robotic device to a human operator in an exemplary embodiment.

FIG. 4 is a flow chart illustrating a method 400 of virtually displaying robotic device 204 to human operator 206 in an exemplary embodiment. The steps of method 400 will be described with respect to positioning system 300 of FIGS. 2-3, although one skilled in the art will understand that the methods described herein may be performed by other devices or systems not shown. The steps of the methods described herein are not all inclusive and may include other steps not shown. The steps for the flow charts shown herein may also be performed in an alternative order.

Imaging device 222 tracks coordinate data for one or more markers on robotic device 204 (step 402). The marker on robotic device 204 may comprise fiducial marker 234 that is attached to end effector 244 of robotic device 204. Imaging device 223 tracks coordinate data for one or more markers on AR headset 226 (step 404). The marker on AR headset 226 may comprise fiducial marker 236 that is attached to AR headset 226. Imaging devices 222-223 provide the coordinate data to controller 302.

Virtual image generator 310 within controller 302 generates a virtual image of robotic device 204 in the coordinate system based on the coordinate data for the marker on robotic device 204 and the marker on AR headset 226 (step 406). Virtual image generator 310 then provides the virtual image of robotic device 204 to AR headset 226 for display to human operator 206 (step 408). Virtual image generator 310 may transmit the virtual image to AR headset 226 through a wired or wireless connection. Method 400 is continuous so that virtual images of robotic device are sent to AR headset 226 in real-time or near real-time.

Controller 302 may also provide coordinate data for AR headset 226 to robotic device 204 (step 410). Because this step is optional, it is illustrated in FIG. 4 by dotted lines. Robotic device 204 may be operating according to a program having encoded commands, such as a Computer Numerical Control (CNC) program. Robotic device 204 may alter its operating program based on the coordinate data for AR headset 226. For example, if robotic device 204 is programmed to drill a hole at a particular location, robotic device 204 may alter its operating program based on the coordinate data for AR headset 226.

Because virtual image generator 310 receives the coordinate data for the marker on robotic device 204 and the marker on AR headset 226, it is able to determine the relationship between robotic device 204 and AR headset 226 in the coordinate system. The virtual image represents the position and/or orientation of robotic device 204 in the coordinate system which can be viewed by human operator 206 through AR headset 226. As human operator 206 looks through the lenses of AR headset 226, he/she can see both the digital display of robotic device 204 and the real life environment of object 202. For example, if robotic device 204 is programmed to drill a hole through object 202 from its corresponding side 208, the digital display of robotic device 204 illustrates the position and/or orientation of end effector 244 as it drills through object 202.

Figure 5:
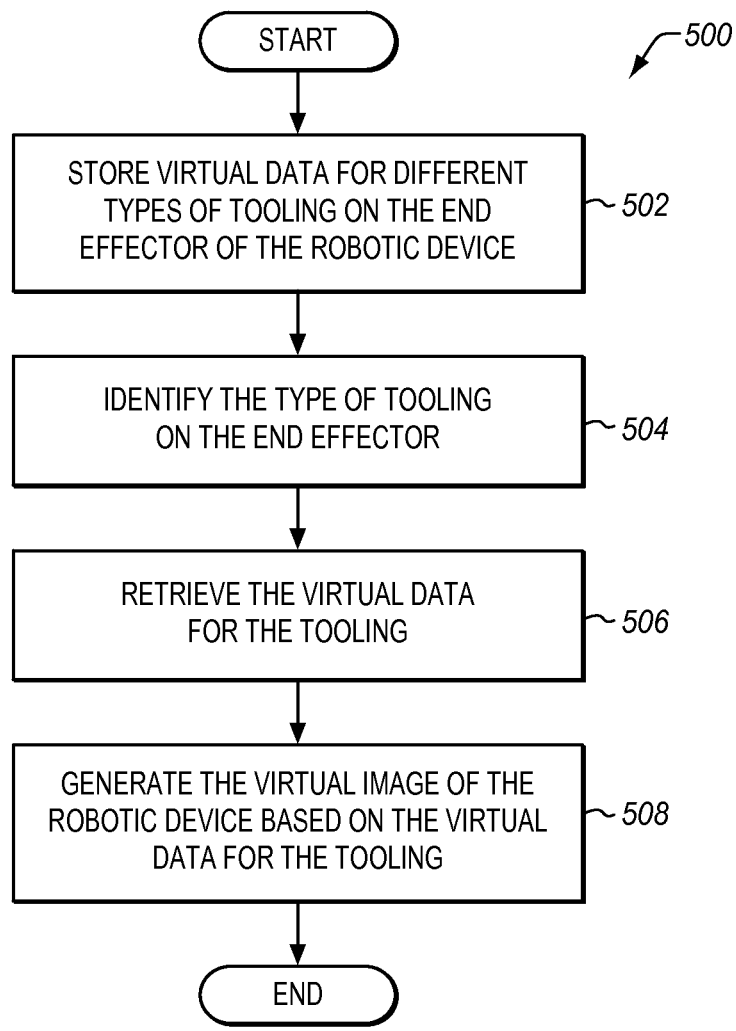
FIG. 5 is a flow chart illustrating a method of generating a virtual image of a robotic device in an exemplary embodiment.

Virtual image generator 310 may use the virtual data 322-324 stored in virtual data storage 320 to generate the virtual image of robotic device 204. FIG. 5 is a flow chart illustrating a method 500 of generating a virtual image of robotic device 204 in an exemplary embodiment. Assume for this embodiment that the tooling on end effector 244 is changeable. As illustrated in FIG. 3, virtual data storage 320 may store virtual data for different types of tooling on end effector 244 of robotic device 204 (step 502). Virtual image generator 310 identifies the type of tooling that is currently on or attached to end effector 244 (step 504), and retrieves the virtual data for that tooling from virtual data storage 320 (step 506). A Radio Frequency Identification (RFID) tag may be affixed to the tooling, and virtual image generator 310 may determine the type of tooling on end effector 244 by reading the RFID tag. With the information obtained from the RFID tag, virtual image generator 310 can acquire the virtual data for that type of tooling from virtual data storage 320. Virtual image generator 310 then generates a virtual image of robotic device 204 based on the virtual data for that type of tooling (step 508). The virtual image of robotic device 204 may represent the tooling on end effector 244, and any other portion of robotic device 204 as desired.

Because human operator 206 is able to see a virtual image of robotic device 204 through AR headset 226, he/she can "see" what is happening on the other side of object 202. Thus, fabrication processes may be performed faster and more efficiently. Also, robot-to-human interaction may be made safer in those instances where the object blocks the operator's view of the robot.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

The invention claimed is:

1. A system comprising:
a robotic device having a tool configured to perform work on an object, wherein a first fiducial marker is attached to the tool, and wherein the robotic device is positioned at a first side of the object;
an augmented reality headset for use by a human operator positioned at a second side of the object that opposes the first side such that the object obstructs a line of sight between the human operator and the robotic device, wherein a second fiducial marker is attached to the augmented reality headset;
a first imaging device having a field of view of the first side of the object, and configured to track coordinate data for the first fiducial marker as the first fiducial marker moves with the tool of the robotic device;
a second imaging device having a field of view of the second side of the object, and configured to track coordinate data for the second fiducial marker as the second fiducial marker moves with the augmented reality headset used by the human operator; and
a controller configured to generate a virtual image of the tool of the robotic device in a coordinate system based on the coordinate data for the first fiducial marker and the coordinate data for the second fiducial marker, and to provide the virtual image of the tool of the robotic device to the augmented reality headset for display to the human operator.

2. The system of claim 1 wherein:
the first fiducial marker and the second fiducial marker each include a plurality of references points having a Light Emitting Diode (LED).

3. The system of claim 1 wherein:
the controller includes:
 a virtual data storage configured to store virtual data for different types of tooling on an end effector of the robotic device; and
 a virtual image generator configured to identify tooling on the end effector, to retrieve the virtual data for the tooling from the virtual data storage, and to generate the virtual image of the robotic device based on the virtual data for the tooling.

4. The system of claim 3 wherein:
the virtual image generator is configured to read a Radio Frequency Identification (RFID) tag to identify the tooling on the end effector.

5. The system of claim 1 wherein:
the first imaging device includes:
 at least one camera; and
 a processor that uses photogrammetry to track the coordinate data for the first fiducial marker.

6. The system of claim 1 wherein:
the controller is configured to provide the coordinate data for the second fiducial marker on the augmented reality headset to the robotic device.

7. The system of claim 1 wherein:
the object comprises a component of an aircraft.

8. A method comprising:
tracking, with a first imaging device, coordinate data for a first fiducial marker attached to a tool of a robotic device as the first fiducial marker moves with the tool, wherein the robotic device is positioned at a first side of an object, and wherein the first imaging device is positioned with a field of view of the first side of the object;
tracking, with a second imaging device, coordinate data for a second fiducial marker attached to an augmented reality headset worn by a human operator, wherein the augmented reality headset is positioned at a second side of the object such that the object obstructs a line of sight between the human operator and the robotic device, and wherein the second imaging device is positioned with a field of view of the second side of the object;
generating a virtual image of the tool of the robotic device in a coordinate system based on the coordinate data for the first fiducial marker and the coordinate data for the second fiducial marker; and
providing the virtual image of the tool of the robotic device to an augmented reality headset for display to the human operator.

9. The method of claim 8 wherein:
the first fiducial marker and the second fiducial marker each include a plurality of references points having a Light Emitting Diode (LED).

10. The method of claim 8 further comprising:
storing virtual data for different types of tooling on an end effector of the robotic device;
identifying tooling on the end effector;
retrieving the virtual data for the tooling; and
generating the virtual image based on the virtual data for the tooling.

11. The method of claim 10 wherein identifying tooling on the end effector comprises:
reading a Radio Frequency Identification (RFID) tag to identify the tooling on the end effector.

12. The method of claim 8 further comprising:
providing the coordinate data for the second fiducial marker on the augmented reality headset to the robotic device.

13. The method of claim 8 wherein:
the object comprises a component of an aircraft.

14. A positioning system for virtually displaying a robotic device to a human operator, the positioning system comprising:
an augmented reality headset for use by the human operator;
a first imaging device having a field of view of a first side of an object, and configured to track coordinate data for a first fiducial marker attached to an end effector of the robotic device, wherein the robotic device is positioned on the first side of the object, and wherein the augmented reality headset is positioned at a second side of the object such that the object obstructs a line of sight between the human operator and the robotic device;
a second imaging device having a field of view of the second side of the object that opposes the first side, and configured to track coordinate data for a second fiducial marker attached to the augmented reality headset, wherein the augmented reality headset is positioned on the second side of the object; and
a controller configured to generate a virtual image of the end effector of the robotic device in a coordinate system based on the coordinate data for the first fiducial marker and the coordinate data for the second fiducial marker, and to provide the virtual image of the end effector to the augmented reality headset for display to the human operator.

15. The positioning system of claim 14 wherein:
the controller includes:
 a virtual data storage configured to store virtual data for different types of tooling on the end effector; and
 a virtual image generator configured to identify tooling on the end effector, to retrieve the virtual data for the tooling from the virtual data storage, and to generate the virtual image based on the virtual data for the tooling.

16. The positioning system of claim 15 wherein:
the virtual image generator is configured to read a Radio Frequency Identification (RFID) tag to identify the tooling on the end effector.

* * * * *